United States Patent [19]

Stafford

[11] Patent Number: 5,025,556
[45] Date of Patent: Jun. 25, 1991

[54] ENGINE BLOCK CYLINDER HEAD BOLT HOLE REPAIR

[75] Inventor: James C. Stafford, Aston, Pa.

[73] Assignee: The United States of America as represented by the Secretary of the Navy, Washington, D.C.

[21] Appl. No.: 554,756

[22] Filed: Jul. 19, 1990

[51] Int. Cl.$^5$ .............................................. B23P 6/00
[52] U.S. Cl. ....................... 29/888.011; 29/888.06; 29/402.06; 29/402.08; 29/402.11; 29/402.18; 408/79
[58] Field of Search ................... 29/888.011, 888.06, 29/402.06, 402.08, 402.04, 402.05, 402.11, 402.18; 408/709, 88, 95, 237, 79; 409/190, 205, 206

[56] References Cited

U.S. PATENT DOCUMENTS

| | | | |
|---|---|---|---|
| 4,234,275 | 11/1980 | Clement | 408/709 X |
| 4,580,931 | 4/1986 | Wilger et al. | 408/709 X |
| 4,625,465 | 12/1986 | Kirt | 408/709 X |
| 4,652,186 | 3/1987 | Sverdlin | 408/81 |
| 4,820,089 | 4/1989 | Shiets | 29/402.06 X |
| 4,850,756 | 7/1989 | Dubois | 408/708 X |

*Primary Examiner*—Irene Cuda
*Attorney, Agent, or Firm*—James V. Tura; James B. Bechtel; Susan E. Verona

[57] ABSTRACT

A method for repairing cylinder head bolt holes including removing the cylinder head from the damaged cylinder bore and removing an adjacent cylinder head from its adjacent cylinder bore. A drill base support is installed in the adjacent cylinder bore and drilling platform studs are installed at locations corresponding to the drill base stud holes. A drill base and a jig are installed and a drill press is used to drill and remove broken bolts. The inside diameter of the damaged bolt hole is measured and studs are installed in the block with adhesive applied to the threads of the studs.

19 Claims, 7 Drawing Sheets

_Fig. 6_  _Fig. 7A_  _Fig. 7B_

ENGINE BLOCK CYLINDER HEAD BOLT HOLE REPAIR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to the repair of engine block cylinder head bolts and engine block cylinder head bolt holes and in particular to the repair of cylinder head bolts and bolt holes in a large diesel engine block.

2. Prior Art

When engine block cylinder head bolts or engine block cylinder head bolt holes for large engines such has the DCC 16V-149 engine require repair, the cost can be extremely high. Since no effective procedure was known, several methods were tried in the prior art. These methods sometimes resulted in further damage to the engines. In some cases the further damaged engines required replacement.

Additionally, because of the extreme heat and stress on engine block cylinder head bolts and holes, it was not possible to reliably prevent a future failure. For example, if the threads of a block were stripped, a hole could be redrilled and plugged. However, there is not very much material in the block and it was impossible to get the kinds of tolerances needed to perform the operation effectively enough to prevent another failure. In addition to the extremely tight tolerances that would have been required to prevent a new failure, almost perfect alignment is required to prevent a new failure. A method of obtaining this kind of tolerance was not known in the prior art.

The object of the present invention is to provide an easier and more economical way to repair engine block cylinder head bolt holes for large engines.

SUMMARY OF THE INVENTION

The method for repairing cylinder head bolt holes includes removing the cylinder head from the damaged cylinder bore and removing an adjacent cylinder head from its adjacent cylinder bore. A drill base support is installed coupled to the adjacent cylinder bore and drilling platform studs are installed at locations corresponding to the drill base stud holes. A drill base and a jig are installed and a drill press is used to drill and remove broken bolts. The inside diameter of the damaged bolt hole is measured and if necessary studs are installed in the block with adhesive applied to the threads of the studs.

DETAILED DESCRIPTION OF THE INVENTION

Figure 1A:
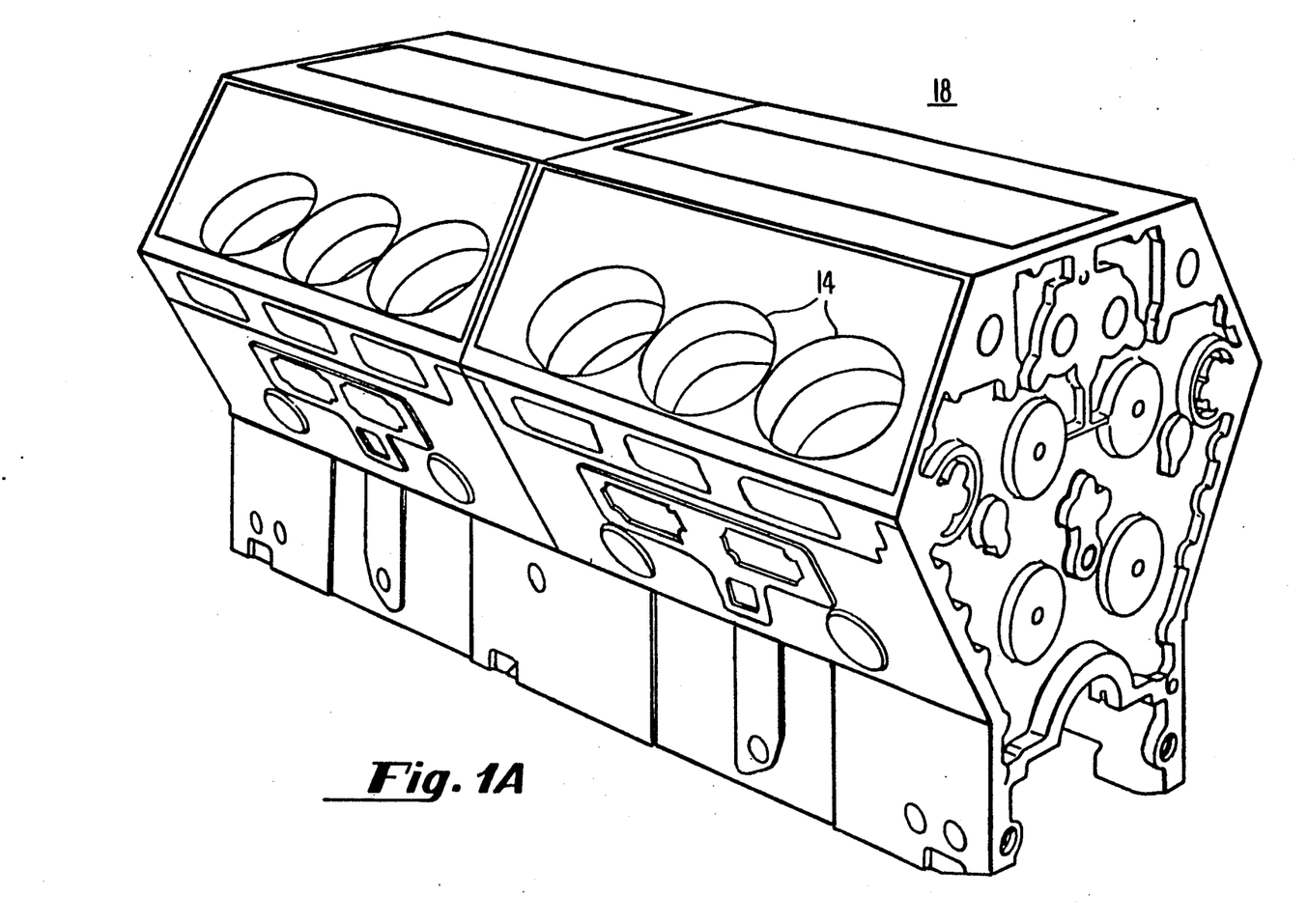
FIG. 1A shows an engine block of an engine suitable for repair in accordance with the method of the present invention.
Figure 1B:
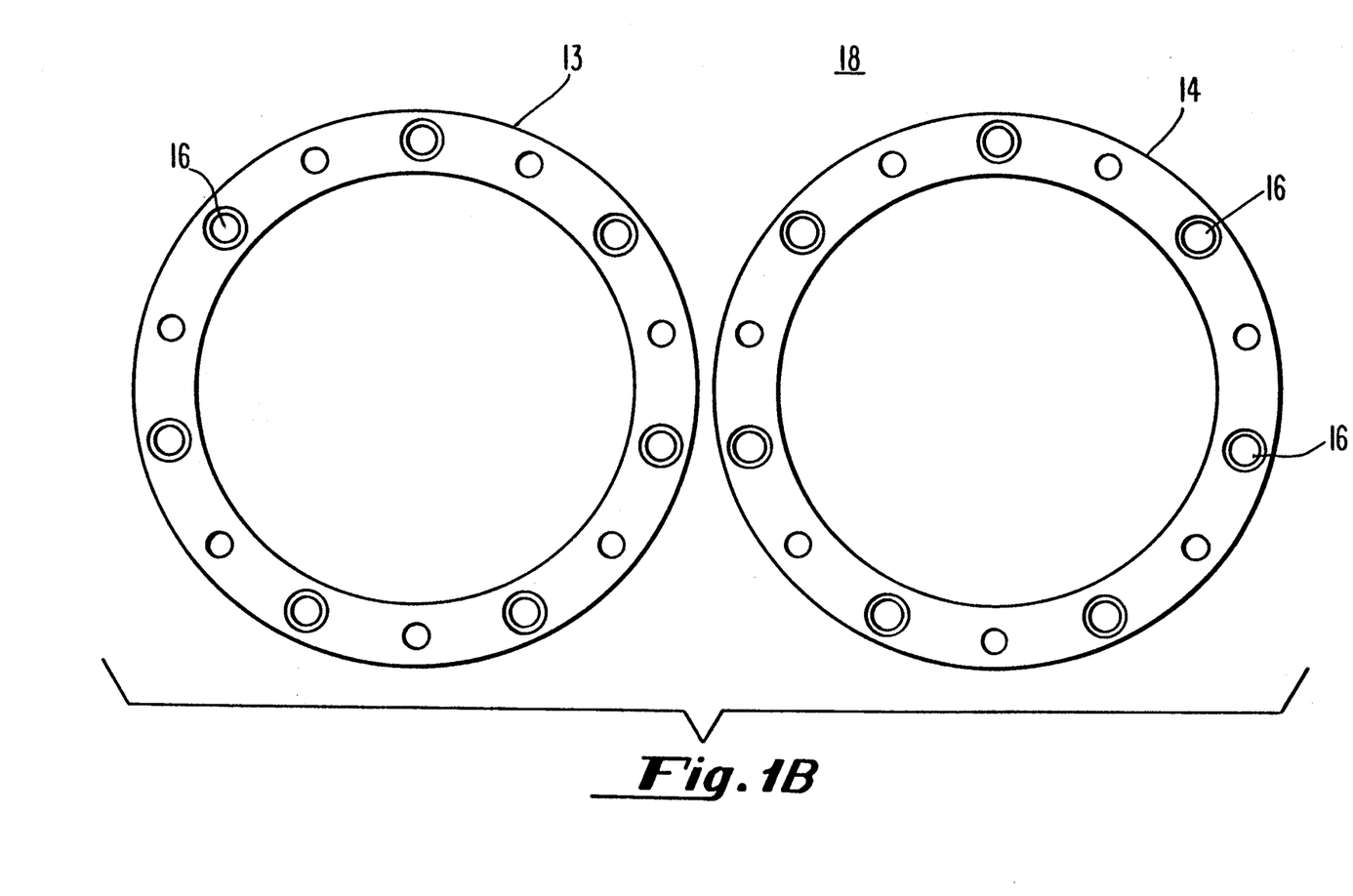
FIG. 1B shows a plan view of a portion of the engine block of FIG. 1A.
Figure 1C:
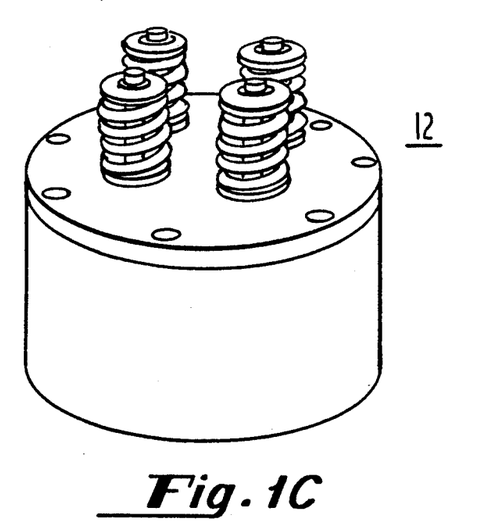
FIG. 1C shows a perspective view of a cylinder head of the engine of FIG. 1A.
Figure 1D:
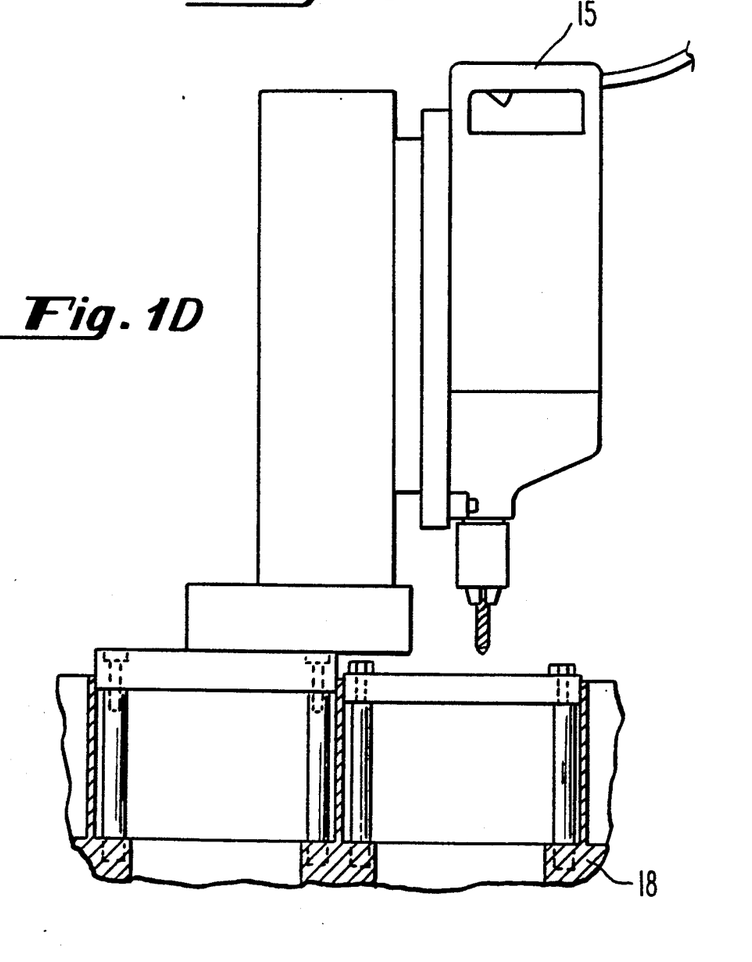
FIG. 1D shows a view of a drill attached to the cylinder head of FIG. 1A.
Figure 2:
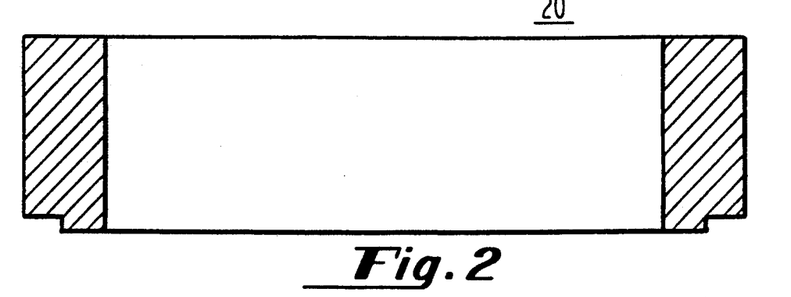
FIG. 2 shows a drill base jig support ring for use in repairing the engine block cylinder head bolt hole of FIG. 1.
Figure 3:
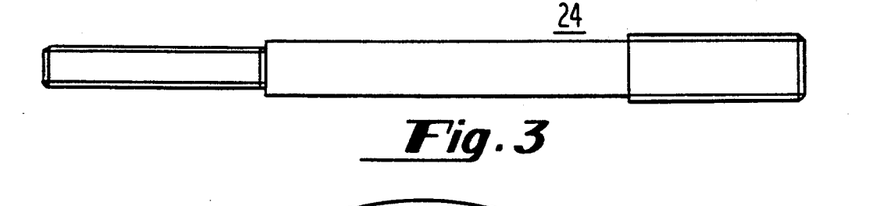
FIG. 3 shows a drilling platform stud for use in repairing the engine block cylinder head bolt hole of FIG. 1.

Referring now to FIGS. 1A, B, 1C and D there is shown engine block 18 having drill 15 attached thereto, damaged engine block cylinder 14 and engine block cylinder head 12. Each cylinder 14 is provided with a plurality of bolt holes 16 for securing cylinder head 12.

Referring now to FIGS. 2-11, there are shown tools useful for performing the repairs of the method of the present inventions. Drill base jig support ring 20 may be formed of aluminum and may be used in cylinder block 18 with or without a cylinder liner (not shown). Drilling platform stud 24 is required for the drilling of engine block cylinder head 12. Drilling platform stud 24 may be formed of grade eight steel. Drill base jig 28 is provided with a plurality of spaced apart holes 30 arranged in a circle. Three holes 30 are counterbored fifteen sixteenths of an inch in diameter by one and one-half inches deep. All projections on the top of cylinder head 12 are removed.

Figure 6:
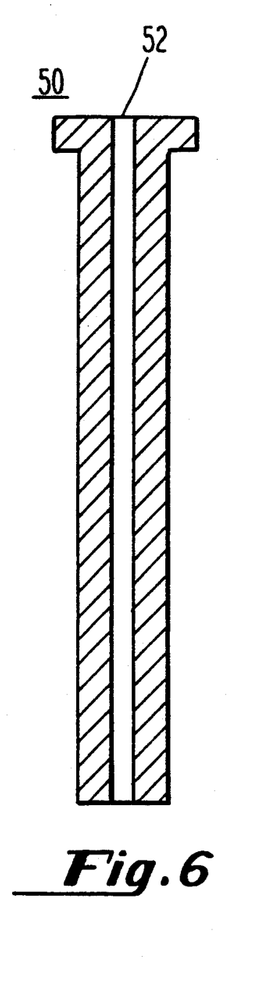
FIG. 6 shows pilot guide bushings for use in repairing the engine block cylinder head bolt hole of FIG. 1.
Figure 7A:
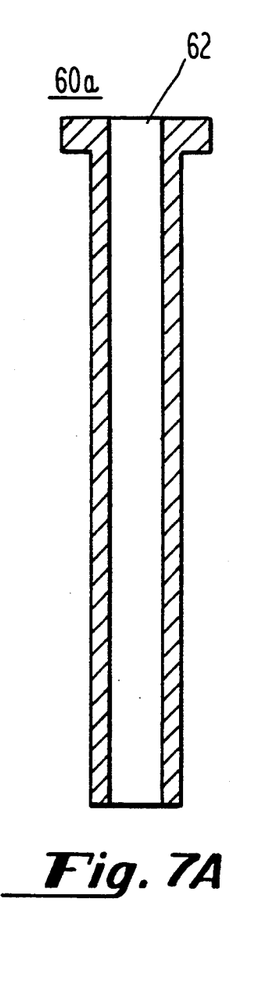
FIGS. 7A, B show further pilot guide bushings for use in repairing the engine block cylinder head bolt hole of FIG. 1
Figure 7B:
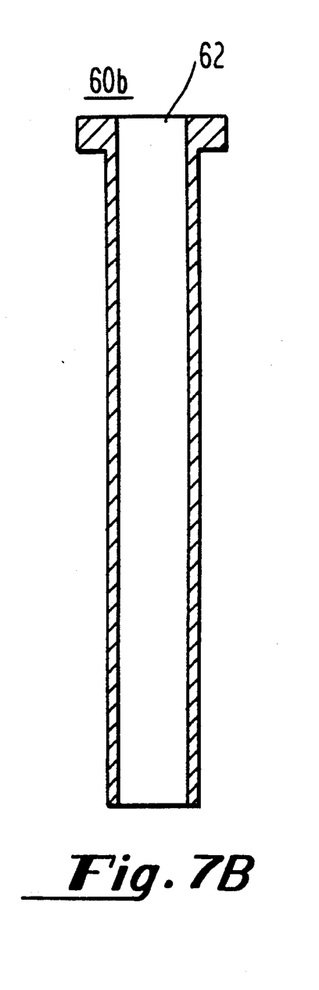
Figure 8:
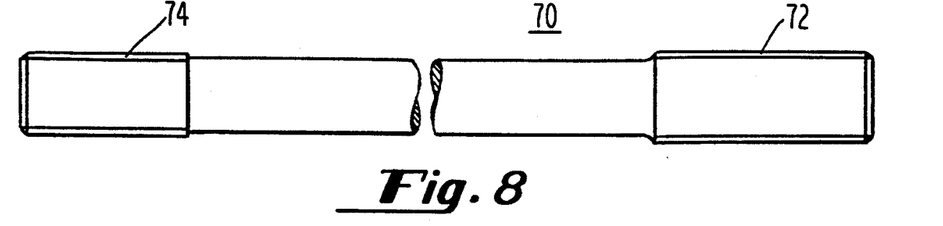
FIG. 8 shows an oversized stud for use in repairing the engine block cylinder head bolt hole of FIG. 1.

Pilot guide bushing 50 is provided with an axial passageway 52 through the entire length of pilot guide bushing 50. Additionally, at the end of the shank of bushing 50 a shoulder is provided in order to permit pilot guide bushing 50 to be seated properly. Pilot guide bushing 50 may be approximately six-eighths of an inch in diameter and approximately five inches in length and may be formed of brass. Oversized stud 70 is formed with a shaft having a block end 72 which may be approximately one and five-eighths inches in length. Oversized stud 70 may be formed of grade eight carbon steel and may have an overall length of seven and fifteen sixteenths inches.

Cylinder head 12 is removed from damaged cylinder bore 14. Additionally, an adjacent cylinder head is removed from its cylinder bore 13. In the method of the present invention cylinder heads 12 are removed and installed in a conventional manner as set forth in DDC Service Manual (6SE 313) for series 149 engines. Broken or seized head bolts are removed from cylinder block 18 in accordance with the method of the present invention as follows. Drill base support 20 is installed in cylinder bore 13 adjacent to damaged cylinder bore 14. Four drilling platform studs 24 are installed at locations corresponding to drill base stud holes 30. Drill base jig 26 is installed and secured with flatwashers and nuts. Drilling platform studs 24 must be below the top surface of drill base jig 28.

Figure 5A:
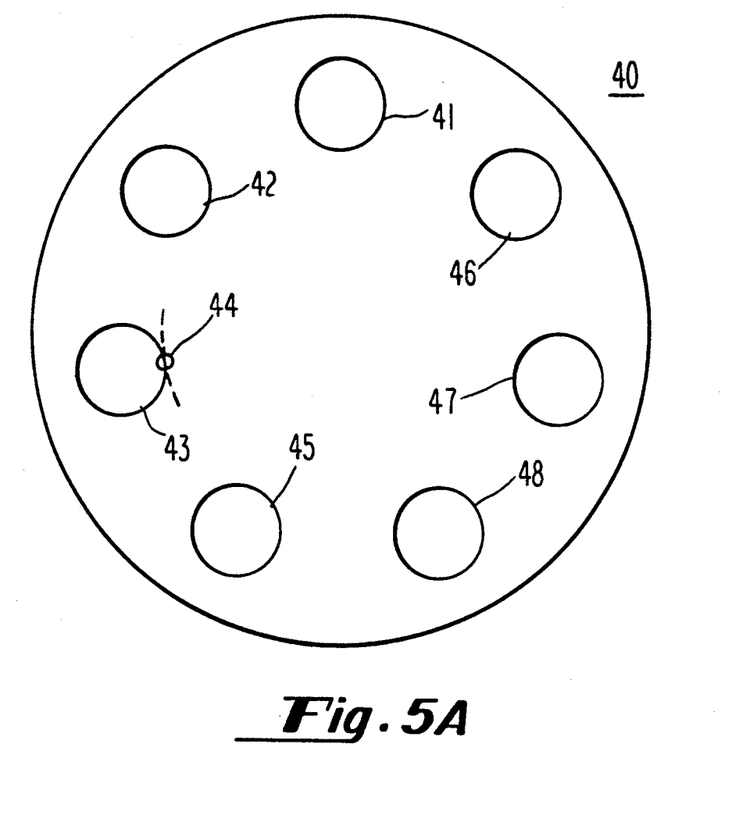
FIGS. 5A, B show a head jig for use in repairing the engine block cylinder head bolt hole of FIG. 1.
Figure 5B:
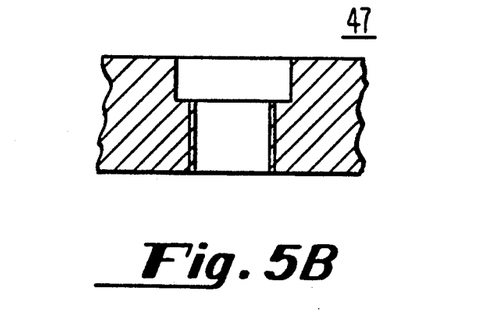

Head jig 40 acts as a template and is installed in a manner to locate five-eights inch ream hole 47 over a broken head bolt. Head jig 40 may be a portion of another engine similar to the engine being repaired. Head jig 40 is secured with cylinder head bolts in hold down bolt holes 41, 43, 48 wherein hold down bolt 43 is provided with anti-rotation pin 44.

Figure 4A:
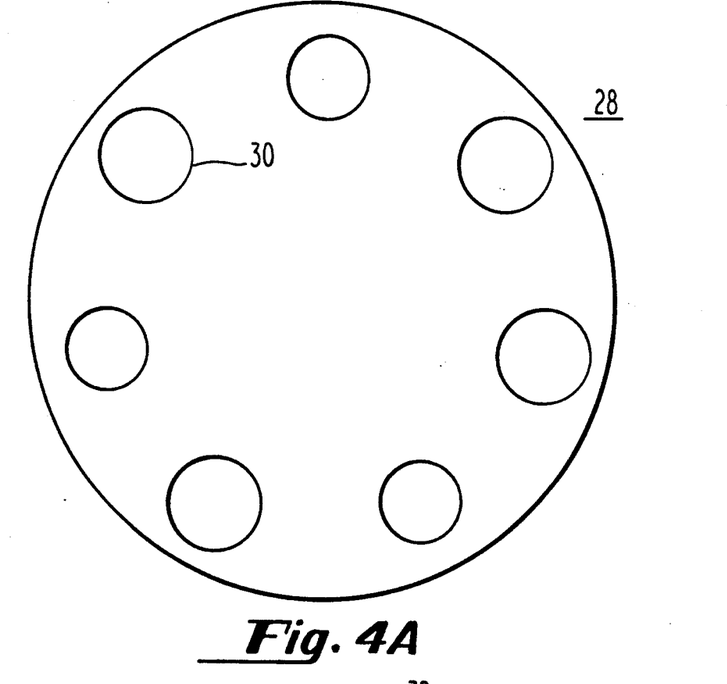
FIGS. 4A, B show a drill base jig for use in repairing the engine block cylinder head bolt hole of FIG. 1.
Figure 4B:
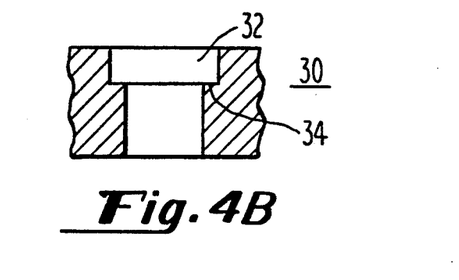

One eighth-inch pilot guide bushing 50 is then installed in five-eighths inch diameter ream hole 47 to guide a tap drill (not shown). A magnetic base drill press (not shown) is mounted on drill base jig 28 using a one-eighth inch drill bit to align the drill press with pilot guide bushing 50. The magnetic base drill press is then locked into position. Using the one-eighth drill bit, the broken bolt is drilled out. A drilling depth of two and one-tenth inches from the top of the cylinder liner pilot bore seating surface should not be exceeded. Metal drilling chips should be cleaned out of the damaged hole after each drilling process. The damaged hole should also be blown out with compressed air.

One-eighth inch pilot guide bushing 50 is then removed and replaced with three-eights inch pilot guide bushing 60a. The broken head bolt is then drilled with a three-eighths inch drill bit by way of pilot guide bushing 60a. Head jig 40 may then be removed and the broken head bolt may be removed with a conventional remover. If the broken head bolt still cannot be removed with a conventional remover, jig head 40 is replaced in the same location as previously described and 33/64 inch pilot guide bushing 60b is inserted. The broken bolt is then drilled with a 33/64 inch drill bit by way of pilot guide bushing 60b. Jig head 40 is removed and the remaining material is tapped out with a conventional starter tap.

The drilled cylinder hole is cleaned out and the fit of a new head bolt to the tapped hole is determined. If the new head bolt does not hold one hundred fifty foot pounds with cylinder head 12 in place, additional repair of the damaged cylinder bolt hole is necessary, including the installation of oversized stud 70.

The inside diameter of the damaged bolt hole is measured with a telescoping gauge (not shown) and an inside micrometer (not shown). If any measurement of the upper fifty percent of the threaded area exceeds 0.58 inches or if thirty percent of the total area exceeds 0.58 inches, the damaged cylinder hole must be plugged. However, if the dimensions of the damaged bolt hole are within specification, oversized studs 70 are machined in the quantity required for the repair. Cylinder head 12 is removed from damaged cylinder bore 14 and the adjacent cylinder head is removed from adjacent cylinder bore 13 as previously described. Drill base support rig 20 and drilling platform studs 24 are also installed so that drill base jig 23 may be again secured.

Head jig 40 is installed with 37/64 inch ream hole 42 is disposed over the damaged bolt hole to be drilled and tapped for oversized studs 70. A magnetic base drill press (not shown) is installed on drill base jig 28. The magnetic base drill press is aligned with 37/64 inch reamed hole 42 using a 37/64 inch drill bit. The magnetic base is locked into position. Using the 37/64 inch drill bit damage cylinder hole 16 is drilled. A drilling depth of two and two-tenths inches, measured from the top of the cylinder liner pilot bore seating surface should not be exceeded.

Head jig 40 is then rotated to locate five eighth inch - ⅛ UNF tapped hole 46 over the 37/64 inch hole. Head jig 40 is secured with head bolts. Using a five-eighths inch-⅛ UNF tap set (not shown), a line tap through head jig 40 is performed beginning with a starter tap. Chips should be broken off and cleaned out of damaged hole 16 frequently. A second tap and finally a bottom tap follow the starter tap. Head jig 40 is removed and the hole and oversized stud 70 are cleaned with a degreasing solvent.

Oversized studs 70 should not protrude above the top surface of cylinder block 18 by more than seven-eighths inch or less than three-quarters inch. Oversized studs 70 may be remachined at stud block end 72 to adjust the height of studs 70. After fitting oversized studs 70, oversized studs 70 are prepared for installation into cylinder block 18. Block end 72 threads of studs 70 are sprayed with a primer. Additionally, the threads of the damaged bolt hole are sprayed with a primer. The primer is allowed to dry for at least five minutes. When the primer is dried an even lengthwise bead of an adhesive is applied to the threads of cylinder block 18 and oversized studs 70. Oversized studs 70 are then inserted into the cylinder block head bolt hole. The insertion should be done with a continuous rotating motion which should continue until oversized stud 70 is completely seated in cylinder block 18. If the installation of oversized stud 70 is disturbed, oversized stud 70 is immediately removed and blot hole 16 and oversized stud 70 are degreased with a solvent. If necessary oversized stud 70 is remachined before attempting another insertion into the damaged bolt hole.

After insertion of oversized stud 70 into the damaged bolt hole 16, the adhesive on oversized stud 70 must cure for a minimum of twelve hours. After the adhesive has cured, cylinder head components and cylinder head 12 are installed into cylinder block bore 14 and head bolts and studs are torqued, in three equal steps, to approximately one hundred and fifty foot pounds. Oversized studs 70 are torqued last.

Figure 9:
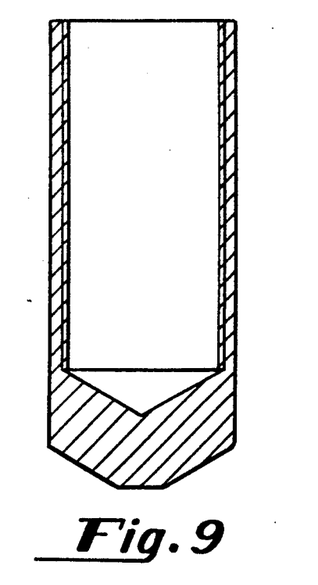
FIG. 9 shows an internally threaded plug for use in repairing the engine block cylinder head bolt hole of FIG. 1.

Twelve hours after the torquing of head bolts and oversized studs 70, the torque of cylinder head oversized studs 70 are checked. The minimum torque should be one hundred forty foot pounds. If the torque does not hold after a second check on oversized studs 70, threaded plug 80 is installed.

Threaded plugs 80 and plug studs 90 are machined as necessary for the repair using the method of the present invention. Cylinder head 12 is removed from damaged cylinder bore 14 and the adjacent cylinder head is removed from the adjacent cylinder bore 13. Oversized studs 70 to be replaced are removed and drill base support 20 with drilling platform studs 24 are installed. Drill base 28 is again installed. Five eighths-inch reamed hole 47 is disposed above bolt hole 16 to be plugged and the magnetic base drill press is again set up on drill base jig 28. The drill press is aligned with the five-eights ream hole using a five-eights inch drill bit. The magnetic base is locked into position. The damaged cylinder bolt hole is then drilled using a five-eighth inch drill bit. A drilling depth of two and two-tenths inches, measured from the top of the cylinder liner pilot bore seating surface should not be exceeded.

Head jig 40 is rotated to locate eleven-sixteenths inch 16 UNF tapped hole 45 over the drilled five-eighths inch hole. Head jig 40 is then secured with head bolts 21. Using a 11/16-16 inch UNF tap set (not shown), the line tap is performed through head jig 40 as previously described. Head jig 40 is removed and, along with threaded plug 80, cleaned with a degreasing solvent. When threaded plug 80 fits the cylinder bolt hole, the external threads of threaded plug 80 are sprayed with a primer and the primer is allowed to dry for five minutes. When the primer has dried for five minutes, an even lengthwise bead of adhesive is applied to the threads on the exterior of threaded plug 80 only.

Threaded plug 80 is installed into the eleven-sixteenths inch tapped cylinder block head bolt hole. A continuous rotating motion must be used and the installation of threaded plug 80 should not stop until threaded plug 80 is completely seated in cylinder block 18. If continuous rotating advancement of threaded plug 80 ceases before seating of threaded plug 80, threaded plug 80 can be removed by redrilling. If threaded plug 80 is installed with a one-eighth inch pilot hole, only head jig 40 is installed so that five-eighths inch reamed hole 46 is disposed over the plugged hole. One-eighth inch pilot guide bushing 50 is installed into the ream hole and the magnetic base drill press is set up on drill base jig 28. The drill press with a one-eighth drill bit is aligned with the one-eighth inch drill bushing and the one eighth pilot hole in plug 80. The magnetic base is locked into position and head jig 40 is secured with head bolts 21.

One-eighth inch pilot guide bushing 50 is removed and replaced with guide bushing 60a. Threaded plug 80 is drilled to a depth of one and one-quarter inches as measured from the top of plug 80. Guide bushing 60a is removed and replaced with guide bushing 60b and threaded plug 80 is drilled using a 33/64 inch drill bit. Head jig 40 is rotated to locate seven-eighths inch diameter reamed hole 43 over drilled out threaded plug 80.

Nine-sixteenths inch tap guide bushing 100 is installed into ream hole 43 on one-quarter inch diameter anti-rotation end 44. Guide bushing 60b is aligned with threaded plug 80 using a 33/64 inch drill bit. When bushing 60b is aligned, head jig 40 is secured with head bolts. Using a nine-sixteenths inch 18 UNF tap set, a line tap to threaded plug 80 is performed through bushing 60b.

Figure 10:
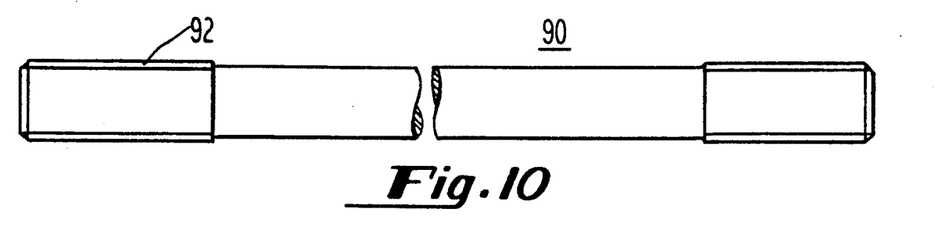
FIG. 10 shows a plug stud for use in repairing the engine block cylinder head bolt hole of FIG. 1.
Figure 11A:
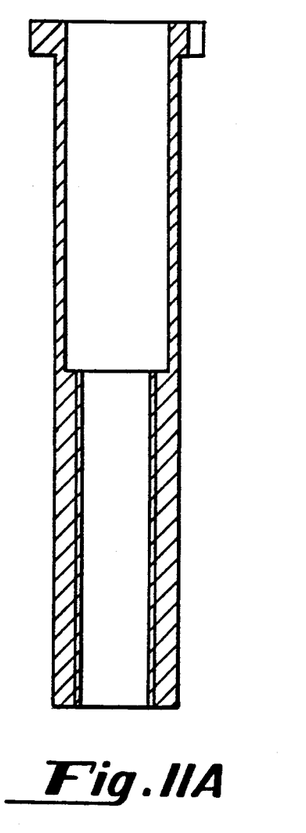
FIGS. 11A, B show tap guide bushing for use in repairing the engine block cylinder head bolt hole of FIG. 1.
Figure 11B:
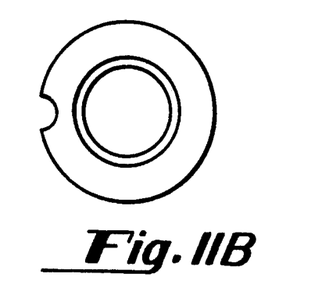

Head jig 40 is removed and threaded plug 80 and plug stud 90 are cleaned with a degreasing solvent. Plug stud 90 should not extend above the top surface of cylinder block 18 more than seven-eighths inch or less than three-quarters inch. If the specifications are not met, plug stud 90 is remachined. Plug hole 16 and plug stud 90 are then cleaned. If threaded plug 80 is installed with internal nine-sixteenth—18 UNF threads already machined, the repair method proceeds to this point without the last use of the magnetic base drill press.

Block end 92 of plug stud 90, as well as the internal threads of plug 80, are sprayed with a primer. The primer is allowed to dry for five minutes. After the five minute period, an even lengthwise bead of adhesive is applied to the block end threads of plug stud 90. Plug stud 90 is then inserted into the cylinder block head plugged bolt hole. When inserting plug stud 90 a continuous rotating motion must be used until plug stud 90 is completely seated in threaded plug 80. The adhesive on threaded plug 80 and plug stud 90 are allowed to cure for a minimum of twelve hours. The cylinder head components and cylinder head 12 are installed into cylinder block bore 14. The head bolts and oversized studs 70 are torqued to one hundred fifty pounds, torquing plug studs 90 last. After a twelve hour period, a determination of the torque of cylinder head oversized studs 70 is made. The minimum torque should be one hundred forty foot pounds.

Thus the method and precision special tools of the present invention provide an effective means for removing broken cylinder head bolts and repairing damaged cylinder head bolt holes wherein a drilling platform and an alignment fixture are installed in adjacent cylinders of the engine being repaired. The platform and fixtures provide precision alignment for the drilling processes which allows for the removal of the broken bolts and reliable repair of the engine. The same platform and fixture are then utilized to repair damaged cylinder head bolt holes by rotating the drill fixture to the function required as described by the methods provided allowing for the installation of replacement studs or inserted plugs attached with adhesive applied to the threads. The drill fixture may be a removed part of an engine similar to the engine being repaired in order to assure precise alignment. Due to the very precise tolerances and alignment made possible by rigidly fixing the drill to the engine it is possible to make repairs which withstand the severe stress caused by usage of the repaired engine.

The method of the present invention may be repeated as necessary to complete the repair of any number of damaged or broken cylinder head bolts or any number of cylinder head bolt holes 16.

It will be understood that various changes in the details, materials and arrangements of the parts which have been described and illustrated in order to explain the nature of this invention, may be made by those skilled in the art without departing from the principle and scope of the invention as expressed in the following claims.

What is claimed is:

1. A method for repairing a damaged engine block cylinder head bolt and a damaged engine block cylinder head bolt hole in a large engine for powering a large vehicle of said engine requiring high precision tolerances and high precision alignment, said engine having a plurality of engine block cylinders, each cylinder having a plurality of engine block cylinders bolt holes, comprising the steps of:
   (a) rigidly fixing drill support means to said engine,
   (b) rigidly fixing drill means to said drill support means,
   (c) rigidly coupling said drill support means to a further engine block cylinder head bolt hole in the vicinity of said damaged bolt hole, and
   (d) drilling said damaged engine block cylinder head bolt hole with high precision tolerances and high precision alignment by means of said rigidly fixed drill while said engine is disposed in said vehicle.

2. The method of claim 1, wherein step (c) is followed by the further step of drilling a damaged bolt within said damaged engine block cylinder head bolt hole.

3. The method of claim 1, comprising the further step of inserting oversized stud means into said drilled engine block cylinder head bolt hole.

4. The method of claim 3, comprising the further step of machining said oversized stud to precisely fit said drilled engine block cylinder head bolt hole.

5. The method of claim 3, comprising the further steps of:
   (d) applying adhesive to said oversized stud and said drilled engine block cylinder head bolt hole; and (e) curing said adhesive.

6. The method of claim 1, further comprising the step of positioning said drill means by means of a template adapted to precisely position said drill means over said damaged engine block cylinder head bolt hole.

7. The method of claim 6, wherein said template is adjustably rotatable to position drill bits of differing sizes over a selected one of said plurality of engine block cylinder head bolt holes.

8. The method of claim 7 wherein said template is formed of a portion of an engine.

9. The method of claim 6, further comprising the step of rotating said template to provide differing template holes for said drill means.

10. The method of claim 9, comprising the further steps of:
(h) drilling said threaded plug; and
(i) inserting a plug stud into said drilled threaded plug.

11. The method of claim 1, comprising the further steps of:
(f) drilling said damaged engine block cylinder head bolt hole to increase the diameter of said damaged engine block cylinder head bolt hole;
(g) inserting a threaded plug into said enlarged diameter engine block cylinder head bolt hole.

12. A method for repairing a damaged engine block cylinder head bolt and a damaged engine block cylinder head bolt hole in a large engine for powering a large vehicle said engine requiring high precision tolerances and high precision alignment, said engine having a plurality of engine block cylinders, each cylinder having a plurality of engine block cylinder head bolt holes, comprising the steps of:
(a) rigidly fixing drill support means to said engine,
(b) rigidly fixing drill means to said drill support means,
(c) positioning said drill means by means of a template adapted to precisely position said drill means over said damaged engine block cylinder head bolt hole, and
(d) drilling said damaged engine block cylinder head bolt hole with high precision tolerances and alignment by means of said rigidly fixed drill while said engine is disposed in said vehicle.

13. The method of claim 12, wherein said template is adjustably rotatable to position drill bits of differing sizes over a selected one of said plurality of engine block cylinder head bolt holes.

14. The method of claim 12, wherein said template is formed of a portion of an engine.

15. The method of claim 12, further comprising the step of rotating said template to provide differing template holes for said drill means.

16. The method of claim 12, comprising the further steps of:
(e) drilling said damaged engine block cylinder head bolt hole to increase the diameter of said damaged engine block cylinder head bolt hole; and
(f) inserting a threaded plug into said enlarged diameter engine block cylinder head bolt hole.

17. The method of claim 16, comprising the further steps of:
(g) drilling said threaded plug; and
(i) inserting a plug stud into said drilled threaded plug.

18. The method of claim 12, wherein step (c) is followed by the further step of drilling a damaged bolt within said damaged engine block cylinder head bolt hole.

19. The method of claim 12, wherein there is provided a further engine block cylinder head bolt hole in the vicinity of said damaged engine block cylinder bolt hole and step (a) comprises the step of coupling said drill support means to said further engine block cylinder head bolt hole.

* * * * *